United States Patent [19]
Cobb et al.

[11] Patent Number: 6,070,197
[45] Date of Patent: May 30, 2000

[54] OBJECT ORIENTED TRANSACTION MONITOR FOR DISTRIBUTED TRANSACTION PROCESSING ENVIRONMENTS

[75] Inventors: Edward Ellis Cobb, Saratoga, Calif.; Simon Anthony James Holdsworth, Andover; Iain Stuart Caldwell Houston, Bradford Abbas, both of United Kingdom; Stanley Alan Smith, Austin, Tex.

[73] Assignee: International Business Machines Corporation, Armonk, N.Y.

[21] Appl. No.: 08/909,575

[22] Filed: Aug. 12, 1997

Related U.S. Application Data

[63] Continuation of application No. 08/357,837, Dec. 16, 1994, abandoned.

[51] Int. Cl.[7] .................................................. G06F 15/163
[52] U.S. Cl. .............................................. 709/303; 707/10
[58] Field of Search ...................... 395/800; 709/300–305

[56] References Cited

U.S. PATENT DOCUMENTS

| | | | |
|---|---|---|---|
| 5,095,471 | 3/1992 | Freund ..................................... | 395/650 |
| 5,475,817 | 12/1995 | Waldo et al. ............................ | 395/650 |
| 5,530,848 | 6/1996 | Gilbert et al. ........................... | 395/600 |
| 5,542,078 | 7/1996 | Martel et al. ............................ | 395/600 |
| 5,613,148 | 3/1997 | Bezviner et al. ........................ | 395/800 |

OTHER PUBLICATIONS

Albert et al, "Automatic Importation of relational schemas in Pegasus", IEEE, pp. 105–113, Feb. 1993.
Rafii et al, "Integration Strategies in Pegasus Object oriented multidatabase system", IEEE, pp. 323–334, Jan. 1992.
Ahmed et al, "an Overview of pegasus", IEEE, pp. 273–277, Feb. 1993.
Rafii et al, "Multidatabase management in pegasus", IEEE, pp. 166–173, Mar. 1991.
Transaction Service Proposal, OMG TC Document Nov. 1, 1993.
The Common Object Request Broker: Architecture & Specification Revision 1.2 Chap. 9, 1993.
Shelton, Robert, "OMG Corba 2.0", *Distributed Computing Monitor*, May 93, v8, n5 p3(14).
Burleson, Don, "Managing distributed databases", *Database Programming & Design*, Jun. 94 v7 n6, p 26 (8).
Bernstein, Phillip A, "Transaction processing monitors" *Communications of the ACM*, Nov. 90 v33, n11, p75(12).

(List continued on next page.)

*Primary Examiner*—Majid A. Banankhah
*Assistant Examiner*—Pat Caldwell
*Attorney, Agent, or Firm*—David A. Mims, Jr.; Lisa B. Yociss; Andrew J. Dillon

[57] ABSTRACT

An object oriented transaction processing system based on the Object Management Group Object Management Architecture provides effective transaction scheduling and servicing through a combination of Object Transaction Services and a Transactional Object Request Broker. The Object Transactional Services manage the information needed to provide reliability in transactions, including a two phase commit process to implement transaction atomicity. The transactional Object Request Broker includes a transaction monitor facility to schedule objects to respond to object transaction requests. The tunable transaction monitor increases the efficiency of transaction processing by optimizing use of computer system resources allocated to servicing transactions. The transaction monitor activates the objects necessary to satisfy a transaction request. Activation includes an ability to start new processes or threads of execution or to reuse existing processes or threads. The transaction monitor interfaces to the Object Request Broker are clearly defined allowing substitution of different transaction monitors as dictated by the application.

4 Claims, 6 Drawing Sheets

OTHER PUBLICATIONS

Taylor, Paul et al; "Combining Object Oriented Systems and Open Transaction Processing"; Computer Journal, vol. 37, pp 1–21, Aug. 94.

The Common Object Request Broker: Architecture and Specification, OMG Document No. 91.12.1, Revision 1.1, Dec. 1991, pp. 13–44.

X/Open CAE Specification, Distributed Transaction Processing: The XA Specification, X/Open Company Ltd., pp. 1–18.

X/Open Preliminary Specification, Distributed Transaction Processing: The TX (Transaction Demarcation) Specification, X/Open Company Ltd., pp. 1–103.

Object Transaction Service, OMG Document 94.8.4, Aug., 1994, pp. 1–103.

OBJECT ORIENTED TRANSACTION MONITOR FOR DISTRIBUTED TRANSACTION PROCESSING ENVIRONMENTS

This is a continuation of U.S. application Ser. No. 08/357,837 filed Dec. 16, 1994, now abandoned.

CROSS-REFERENCE TO RELATED APPLICATIONS

The present application is related to the application entitled, "A System and Method for Creating an Object Oriented Transaction Service that Interoperates with Procedural Transaction Coordinators," filed Oct. 11, 1994 and bearing application serial number 08/320,357.

BACKGROUND OF THE INVENTION

1. Field of the Invention

The present invention relates to computer implemented transaction processing systems. More particularly, it relates to distributed transaction processing systems and still more particularly to object oriented distributed transaction processing systems incorporating transaction monitors.

2. Background and Related Art

Computer implemented transaction processing systems are used for critical business tasks in a number of industries. A transaction defines a single unit of work that must either be fully completed or fully purged without action. For example, in a bank automated teller machine (ATM) from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and actual occurrences.

Distributed transaction processing involves a transaction that affects resources at more than one physical or logical location. In the above example, an ATM transaction affects resources managed at the local ATM device as well as bank balances managed by a bank's main computer. A distributed transaction may not be physically distributed but may involve cooperating tasks that must be completed in synchrony for successful transaction completion.

The X/Open Company Limited (X/Open is a trademark of X/Open Company Ltd.) has promulgated a guide that describes one model for implementing distributed transaction processing. The *X/Open Guide, Distributed Transaction Processing Reference Model*, October 1991, discusses the components of a distributed transaction system and the interrelationships between them. The X/Open Distributed Transaction Processing Model (the DTP Model) describes three main components: an Application Program (AP), a Transaction Manager (TM), and one or more Resource Managers (RMs). The Application Program uses and modifies the resources controlled by one or more of the Resource Managers. The Transaction Manager is responsible for global transactions and coordinates the decision whether to commit or roll-back the actions taken by the Resource Managers. (Commit causes the resources to be updated while roll-back causes all work to be discarded returning the resources to the state they were in upon transaction initiation.) The Resource Managers manage specific resources. Resource managers may include a database management system (DBMS), a file system, or similar resource.

Object oriented programming systems are designed to increase the efficiency of program development by enabling object reuse and simplifying system maintenance through clear separation of function.

Each object in an object oriented system encapsulates the data for that object and the procedures or methods for operating on that data. Encapsulation means that the data for an object can be manipulated only by that object using the defined methods.

Object oriented systems also implement object inheritance. Inheritance allows a more specific object to be derived from a general object. The more specific object can "inherit" all of the data and methods of the parent object, but can override selected data and methods and add others to implement its unique function.

The application of object oriented techniques to transaction processing systems raises many new issues but offers opportunities to increase system efficiency through the use of object oriented principles. The Object Management Group, Inc. (OMG) has established standards for interoperable object oriented systems. The overall architecture defined by OMG is the Object Management Architecture (OMA). A central component of OMA is the Object Request Broker that enables objects to send messages to other objects. The Common Object Request Broker Architecture (CORBA) defines the interactions between objects, and in particular, between distributed objects in different computer systems. The ORB provides location transparency and hides the details of communications between objects. CORBA is specified in the OMG publication entitled, *The Common Object Request Broker: Architecture and Specification*, March 1992.

OMG has accepted a specification to standardize transaction processing in object oriented systems. This specification, entitled the *Object Transaction Service (OTS) Specification*, sets forth the requirements for object services necessary to implement a transaction processing system. The OTS specification uses many of the unique capabilities of object oriented systems. The OTS model, however, is designed to allow object oriented systems to operate with the X/Open DTP model and with existing procedural transaction processing systems.

Efficient transaction processing requires that the resources committed to transaction processing be efficiently scheduled. A particular computer system has constraints on processor throughput, memory allocation and input/output capacity. Transaction throughput can be increased by improving the efficiency of transaction processing scheduling. Prior art procedural transaction processing systems have implemented transaction processing scheduling in the form of a transaction monitor or TP Monitor.

Existing transaction monitors, however, are written to support a particular transaction processing system. Transaction monitors exist in the IBM CICS and IMS transaction processing systems and in the Tandem Transaction Management Facility (TMF) system. No object oriented transaction processing system currently implements a transaction monitor.

The technical problem therefore exists to implement a transaction scheduling system for an object oriented transaction processing system. A second technical problem is to develop an overall transaction processing system that can interchangeably use different transaction monitors depending on the particular application requirements. Another technical need is to be able to tune transaction processing by modification of the object activation scheduling process.

SUMMARY OF THE INVENTION

The present invention is directed to an object oriented transaction processing system that supports transaction scheduling by a transaction monitor.

The present invention is directed to a computer implemented transaction processing system comprising: means for accepting transaction requests; means for communicating the transaction requests to a service responsible for such requests; means for scheduling an object resource to respond to the request, the means for scheduling responsive to the means for communicating; and means for activating the object resource in response to the means for scheduling.

It is therefore an object of the invention to provide an object oriented transaction processing system that schedules transaction servicing resources.

It is yet another object of the invention to provide an object oriented transaction processing system that has a replaceable transaction monitor.

It is yet another object of the invention to provide a tunable object activation scheduler that can be adjusted to increase throughput for a particular set of transactions in a particular system.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
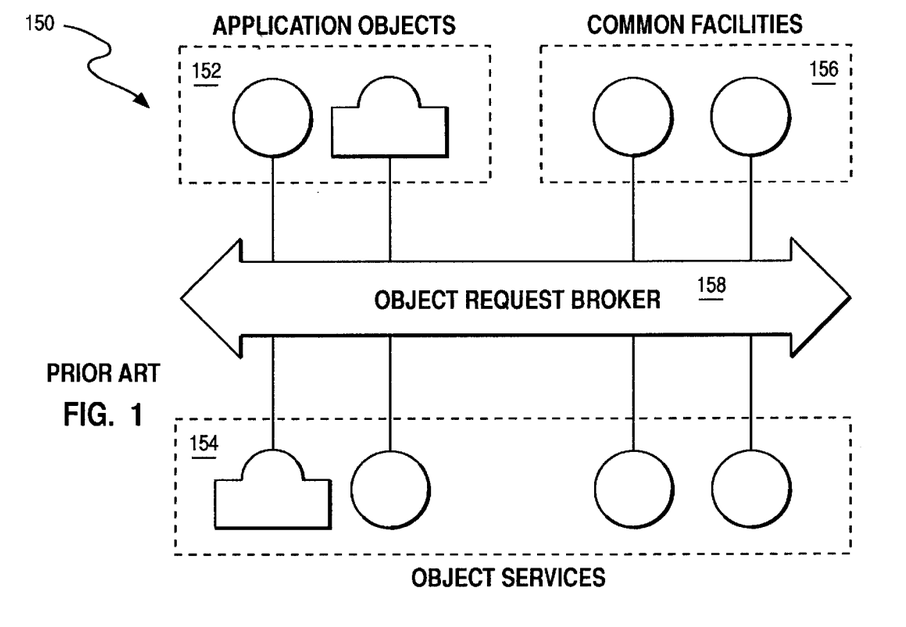
FIG. 1 is a block diagram illustrating the OMG Object Management Architecture.

A high level view of the OMG Object Management Architecture is shown generally at 150 in FIG. 1. Application objects 152 are able to use object services 154 or common facilities 156 by using the Object Request Broker (ORB) 158 to pass an invocation message to the appropriate service. ORB 158 enables objects to send messages to other objects providing location transparency and hiding the details of communication. Object services 154 is a collection of services with object interfaces that provide basic functions for realizing and maintaining objects. Examples of object services include object naming, event notification, life cycle operations and persistent storage. Common facilities 156 is a collection of classes and objects that provide general purpose capabilities useful across many applications. Examples of common facilities include user interfaces and systems management. Application objects 152 are specific to a particular end user application and are typically provided by vertical industry groups. Application development is streamlined through the use of common facilities and object services. These existing objects can be used by an application avoiding the need to redevelop those services for that specific application.

Figure 2:
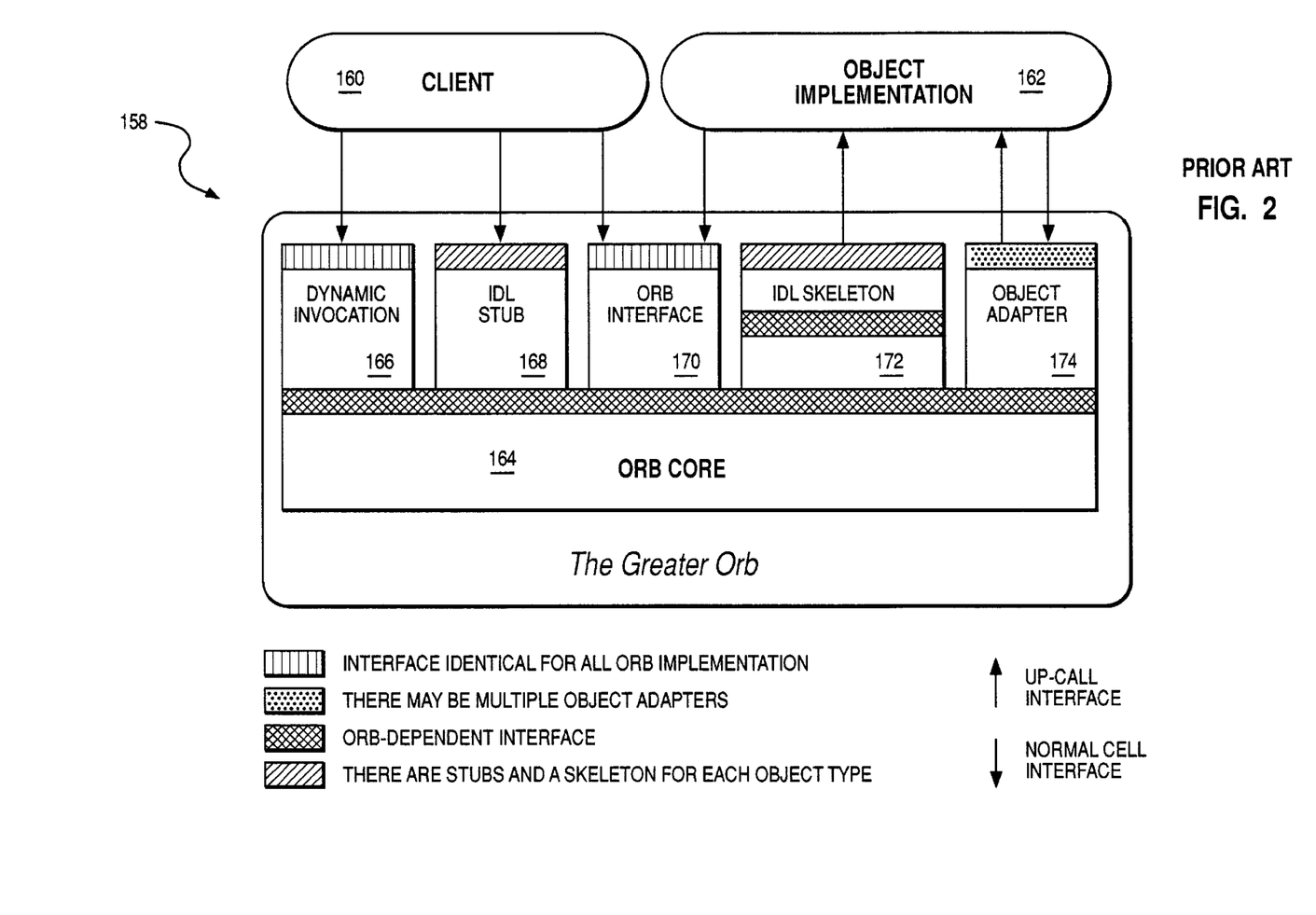
FIG. 2 is a block diagram illustrating the components of an Object Request Broker implementation.

Object Request Broker (ORB) 158 is shown in greater detail in FIG. 2. A client 160 requests object invocation using the ORB. Client 160 can be in application 152, common services 154, common facilities 156 or other service connected to the ORB 158. The invocation request causes invocation of an object implementation 162 that can be from any of the above mentioned object groups. The ORB provides both static and dynamic invocation of objects. The dynamic invocation interface 166 supports application requests constructed at run time and then passed to the ORB. The Interface Definition Language, IDL, is used to describe the interfaces provided by an object implementation external to its source language implementation. The IDL defines the object's signature. IDL stubs 168 are built by the compiler when client code is developed and are bound into the client's executable code. The IDL skeletons 172 provide linkages between the ORB and a particular object implementation. IDL skeletons 172 are built by the IDL compiler and bound to the object's executable code. ORB interface 170 defines the ORB related interface. Object adapter 174 is responsible for implementing a particular object activation policy.

One of the object services 154 is the Object Transaction Service for managing transactions. The Object Transaction Service model defined by the Object Management Group is shown generally in FIG. 3. A distributed client/server (C/S) application is shown at 120. The application 120 comprises a number of objects that exchange messages to accomplish the actions required by the transaction. The objects present in the application include one or more Transactional Clients 122 that invoke operations of transactional objects. The object that begins a transaction is the transaction originator and the originator sends a message 138 to the Transactional Service at the beginning and end of a transaction. A transactional object is an object whose behavior is affected by being invoked within the scope of a transaction. A transactional object typically contains or refers to persistent data that can be modified by transactional requests. Persistent data is that data that will survive a system restart. Persistent data typically resides on disk storage devices, non-volatile memory or similar devices.

Figure 3:
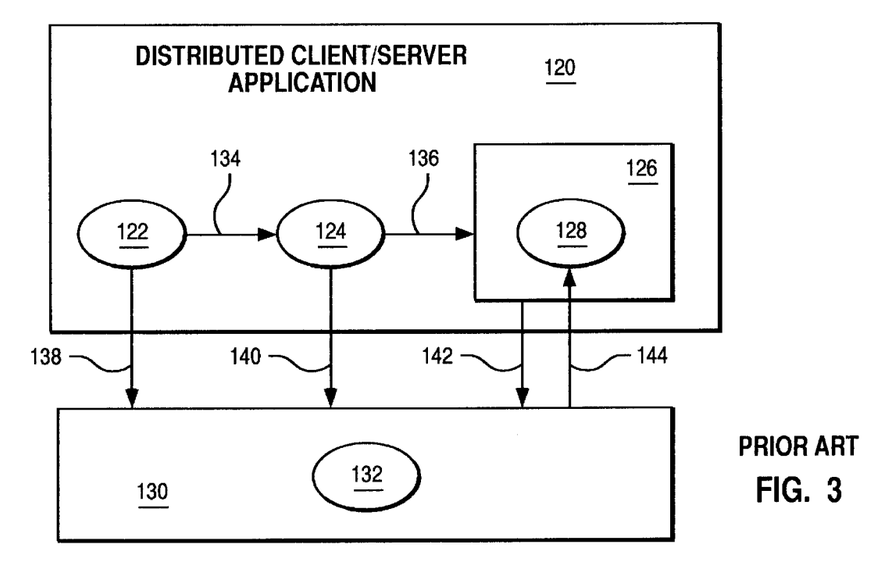
FIG. 3 is a block diagram of a client/server application using Object Transaction Services.

Transactional objects are used to implement two types of application servers: a transactional server 124 and a recoverable server 126. A recoverable server implements protocols necessary to respond to a transactional server and ensure that all participants in the transaction agree on the outcome, either to commit the transaction or roll-back the transaction, and to be able to recover from failure. A recoverable object is a transactional object, but not all transactional objects are recoverable. Non-recoverable transactional objects may implement their state using some other recoverable object.

A recoverable object must participate in Transaction Service 130 protocols. Transaction Services 130 maintain certain data defining the scope of each transaction as transaction context 132. A transaction context 132 is associated with each ORB-aware thread (Object Request Broker (ORB) characteristics are defined by the OMG CORBA architecture.) The transaction context 132 is submitted with each request generated from the client application and is used to define operational environment characteristics where the request is processed. Contents of the transaction context 132 can include a reference to the transaction coordinator, ancestor references for nested transactions, a globally unique transaction id for the transaction coordinator and implementation specific data understood by the subordinate transaction coordinator.

Recoverable objects participate in Transactional Services 130 by registering a Resource 128 with the Transaction Service. The Transaction Service 130 drives the commit protocol (the two phase commit) by contacting those resources registered for a transaction.

A transactional server 124 is a collection of one or more objects whose behavior is affected by the transaction but have no recoverable states of their own. A transactional server implements transactional changes using other recoverable objects. A transactional server does not participate in the completion of the transaction but can force the transaction to be rolled back by sending a roll back message 140.

A recoverable server 126 is a collection of objects, at least one of which is recoverable. A recoverable server participates in the protocols by registering one or more Resource objects 128 with the Transaction Service using a Registration message 142. The Transaction Service drives the commit protocol by issuing requests 144 to the resources registered for a transaction.

Figure 4:
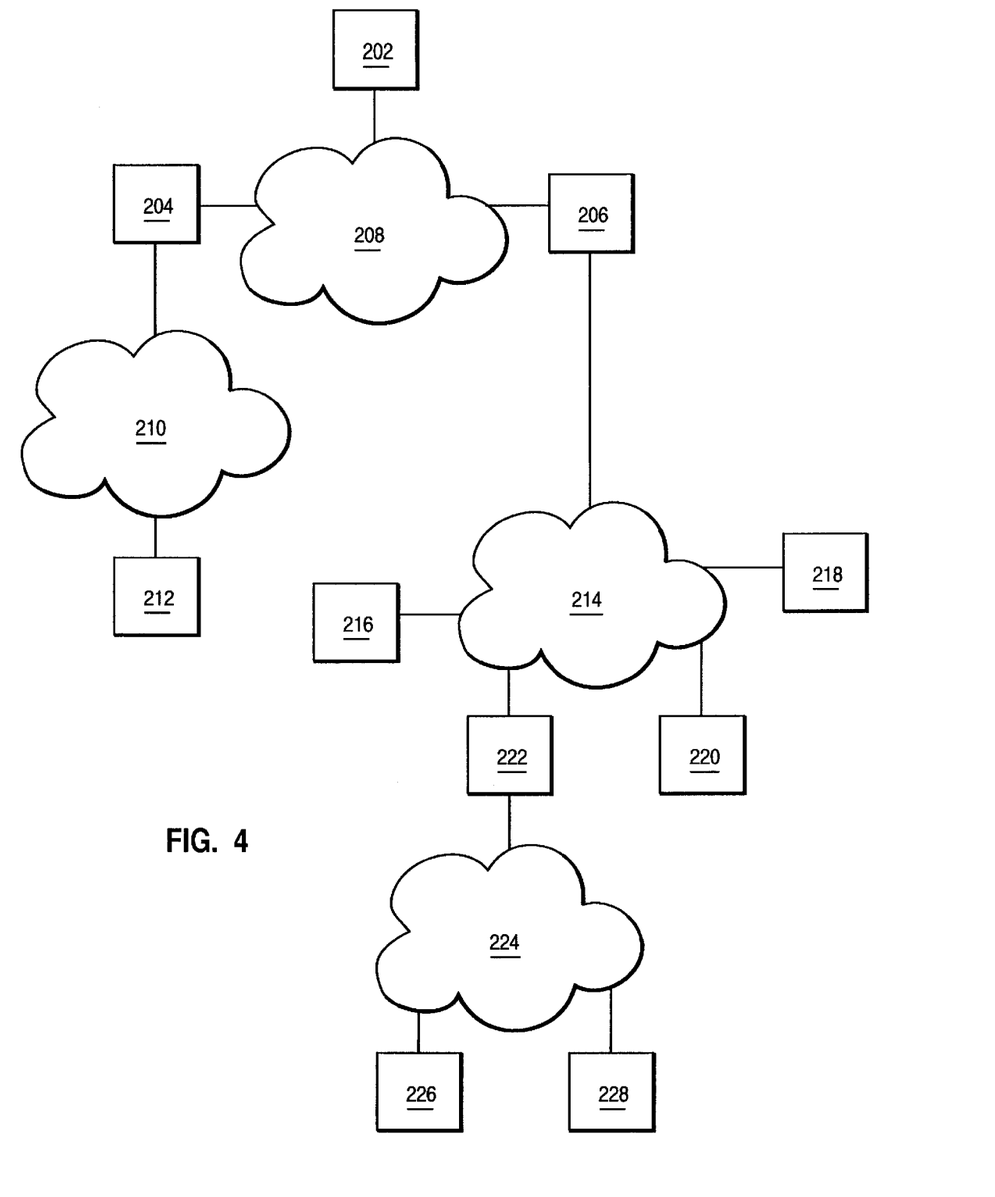
FIG. 4 is a block diagram of a distributed processing system in which the present invention is practiced.

An example of a distributed processing system according to the present invention is shown generally in FIG. 4. Several computer systems are interconnecting using communication networks. For example, systems 212 and 204 are connected by network 210. Systems 204, 202, and 206 by network 208. Systems 206, 216, 218, 220, and 222 by network 214 and systems 222, 226, and 228 by network 224. The networks can be any known local area network (LAN) or wide area network (WAN), including token ring, Ethernet or other network. The "network" can also be the communication bus between multiple processes in a single computer system.

Figure 5:
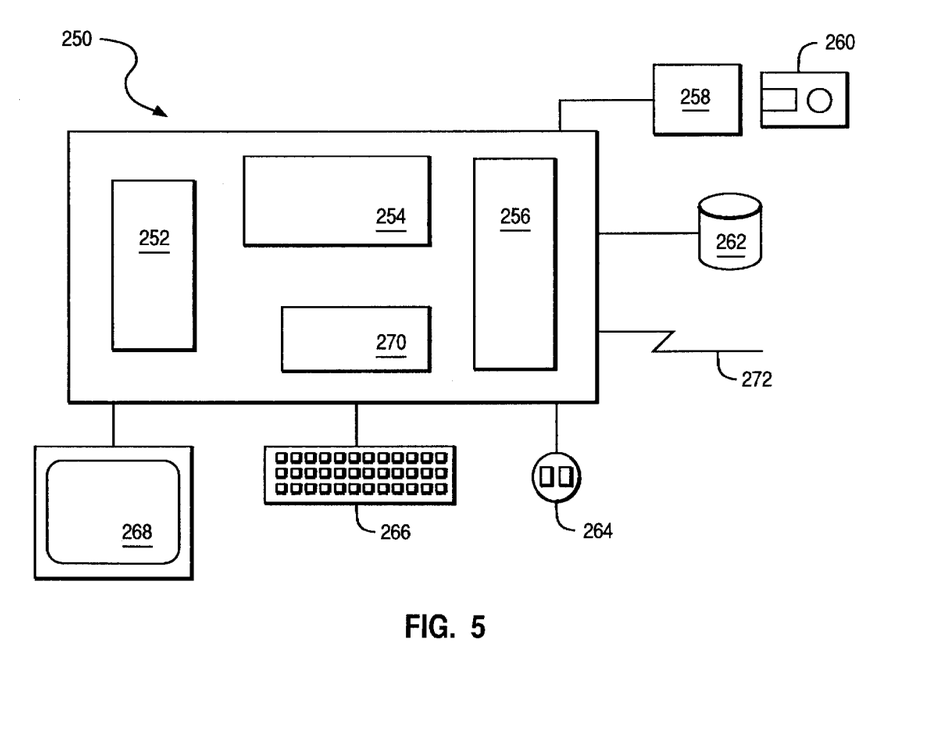
FIG. 5 is a block diagram of a computer system in which the present invention is practiced.

A typical computer system is shown in FIG. 5. Each system 250 contains one or more central processing units 252, volatile memory 254, and input/output controller 256. The input/output controller 256 manages writing to magnetic or optical disk storage 262, removable storage 258, 260 and to display 268, keyboard 266 and pointing device 264. System communication controller 270 manages communications with a network via communication link 272. This configuration is provided for exemplary purposes only and is not intended to be limiting. A commercially available computer system such as the IBM PS/2 computer or IBM RISC System/6000 workstation are examples of the types of systems on which the invention may be practiced. (PS/2 and RISC System/6000 are trademarks of the IBM Corporation.) As discussed above, the systems of a distributed environment may all be linked via a single communications bus sharing memory and disk storage.

Computer system 250 is controlled by an operating system such as the OS/2 operating system, or the AIX operating system (OS/2 and AIX are trademarks of the IBM Corporation.) Network communications may be managed by a network operating system such as Novell Netware operating system, or the IBM LAN Server operating system (Netware is a trademark of the Novell Corp.) The present invention is practiced using a program in computer memory or suitable hardware to control a computer system such as those described above.

Transaction processing monitors (TP monitors) provide an environment in which many existing commercial applications use transaction technology. A TP monitor can be characterized as a light weight scheduler that is optimized for short running applications favored by the flat and nested transaction models. TP monitors act as a "traffic cop" to allow a large number of clients to efficiently access a much smaller number of application servers. An example of TP monitor use is in an airline reservation system where tens of thousands of reservation terminals are linked to a single central reservation system that supports a single passenger and flight database. Additional background information on transaction processing systems can be found in *Transaction Processing: Concepts and Techniques*, by Jim Gray, copyright 1993.

Figure 6:
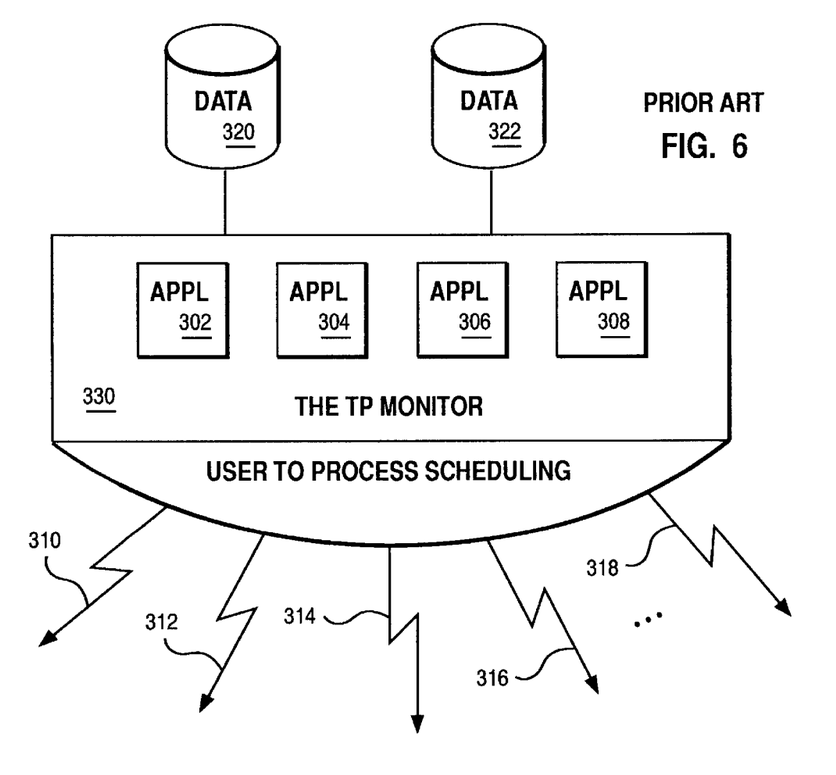
FIG. 6 is a diagram illustrating a transaction processing system having a TP Monitor.

FIG. 6 is a high level view of a transaction processing system with a TP monitor. A small number of applications 302 304 306 308 managing data in databases 320 322 are accessed by a number of users connected through communication lines 310 312 314 316 318. The number of communication lines could be in the hundreds or thousands or even greater while the number of applications remains near four. The number of applications will probably need to increase as the number of clients increases, but at a much slower rate than the rate of client increase. The TP monitor 330 is responsible for efficiently scheduling each user request to a process executing one of the applications.

Examples of existing commercial TP monitors include IBM Transaction Processing Facility (TPF), IBM Customer Information Control System (CICS) and Information Management System (IMS), and DEC ACMS and Intact, and Tandem Transaction Management Facility (TMF). An additional, client side scheduler is Transarc ENCINA. These TP monitors simplify application development because the application program (the client program) do not have to include the details of scheduling a shared resource. The TP monitor handles support for multithreaded processing and asynchronous scheduling of processes to increase throughput. The TP monitor ensures that all terminals are serviced and transactions handled.

The advent of the personal computer and distributed processing lead to a new model for shared data applications. The emphasis shifted from scheduling centralized processes to scheduling program access to shared data (a data centric view.) The data providers became the focal points since they provided the needed scheduling functions. Database management products simplified access by providing a simple programming interface to access shared data. The database management system hides the complexity of data sharing.

Figure 7:
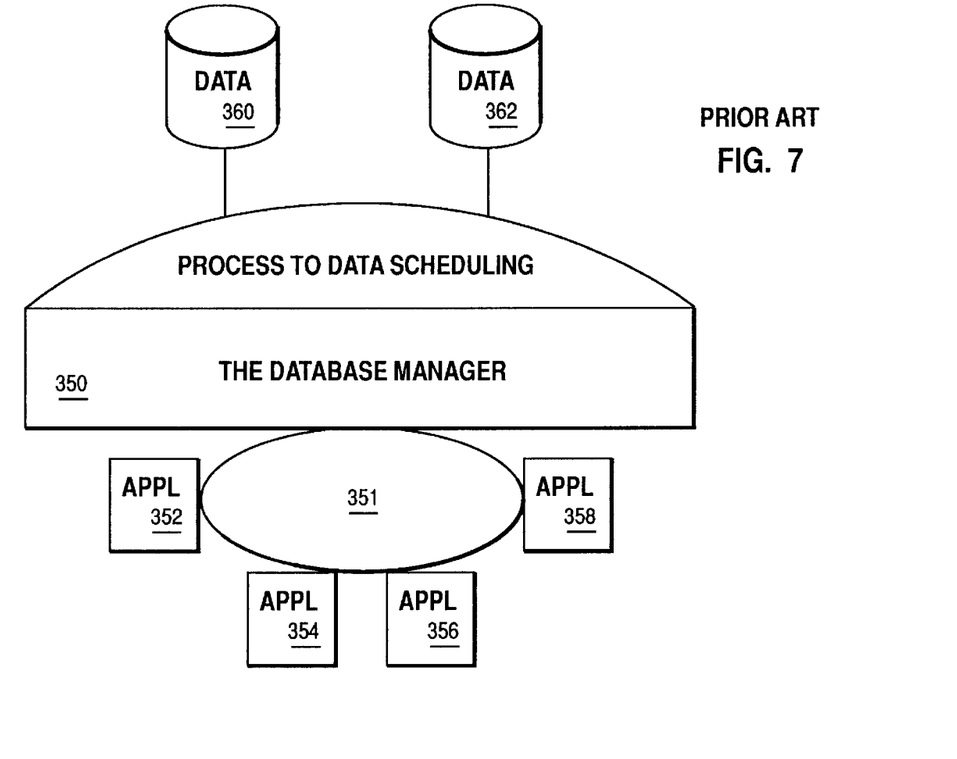
FIG. 7 is a diagram illustrating a data centric transaction system.

FIG. 7 illustrates the data centric model. Applications 352 354 356 358 are connected through a network 352 to a database manager 350. Data access requests are sent to the database manager which then coordinates access to data in databases 360 362. Application (process) execution moved from a centralized location to a distributed, desktop location.

Distributed function systems developed in the late 1980s complicated the distributed model of FIG. 7. Processing in a distributed function system is split between the desktop clients and central servers. A portion of the logic executes in the client while another executes in the server. This structure reduces the message traffic over the network by routing a single message from the client to the server to invoke a more complex application at the server. Distributed function systems require an efficient method for interprocess communication over the network. New programming interfaces were developed to support interprocess communication. These interfaces include the IBM Advanced Program to Program Communications (APPC) product implementing a conversational model; the Remote Procedure Call (RPC) model initially found in operating systems based on the UNIX operating system (UNIX is a registered trademark in the United States and other countries licensed exclusively by the X/Open Company Ltd.). The RPC model is based on a language call model to allow subroutine execution in a machine different than that of the calling program. The final interprocess communication mechanism is messaging that allows programs to communicate asynchronously since it does not depend on the real time availability of a communications path. All of these interfaces, however, make the job of programming much more complex and difficult.

Object Request Brokers (ORBs) provide mechanisms for passing client requests to objects regardless of where those objects are on a network. An ORB hides the details of communication from its clients allowing them to concentrate on solving a particular business problem. Existing object invocation is most similar to RPC, though it can easily be extended to asynchronous messaging. The ORB definition, does not, however, provide facilities for efficient scheduling of multiple client requests against a distributed resource, e.g. a database.

An example of a commercially available ORB that supports distributed objects is the IBM Distributed System Object Model component of the IBM SOMobjects program product (DSOM). Additional information about Distributed SOM is available in *SOMObjects User Guide* IBM Publication Number SC23-26PO and the *SOMObjects Specification Sheet*, G221-3651. Distributed SOM provides a CORBA compliant interface to allow objects on one system to invoke objects on another, distributed system.

The ORB specification and Distributed SOM product have only limited facilities to schedule object process creation; objects invoked on the server must already exist in an active object environment or be made to exist at time of activation. The ORB provides no formal mechanism to monitor an object environment and to adjust the number of processes or resources supporting an object environment.

The present invention solves the lack of scheduling ability by creating a 'Transactional ORB' that provides an architecture to support use of a TP monitor with an ORB system. The novel structure of the present invention is created by modifying the Object Adapter (174 in FIG. 2) to create an object adapter with TP monitor facilities.

CORBA object adapters provide for the activation of objects in different execution environments. Different types of adapters are provided to give flexibility in how an object is activated. An object adapter, according to CORBA, "is the primary interface that an bimplementation uses to access ORB functions . . . " An object adapter can provide flexibility in how an object is activated, e.g. through the creation of a new process; the creation of a new thread within an existing process; or through the reuse of an existing process or thread.

Figure 8:
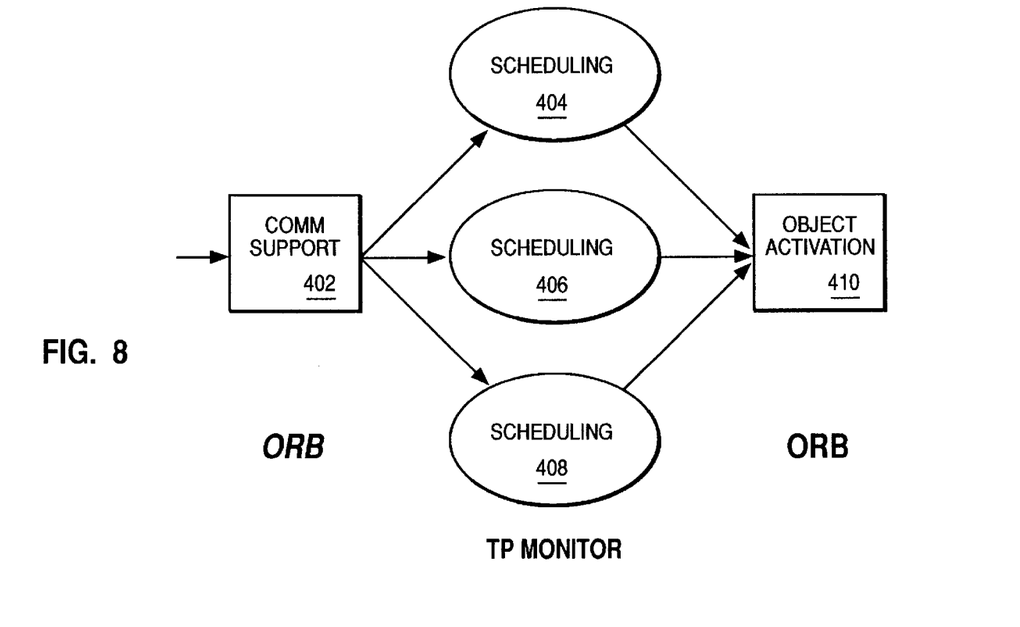
FIG. 8 is a block diagram illustrating the components of the preferred embodiment of the present invention.

Object activation can be split into two parts: process creation that creates the object environment; and object activation that activates the requested object. Object activation is a unique function of the ORB environment. Process creation or scheduling is not unique to the ORB and could be replaced or enhanced by existing TP monitors. FIG. 8 illustrates one embodiment of the present invention in which process creation or scheduling is split from object activation. Existing ORB facilities of Communications support 402 and Object activation 410 are supplemented by scheduling processes 404 406 408. The interfaces to the scheduling processes are specified so that any one of several TP monitors can be substituted to provide scheduling functions.

The TP monitors will provide the following functions:

assignment of client requests to a particular application server. This can include process creation as well as reuse of an existing process initialization of the program to handle the client request. This can include program loading and activation.

associating a single program instance with each user. This allows the application to be written for a single user, rather than needing to be written to handle multiple users simultaneously.

These scheduling functions allow TP monitors to improve system performance. A variety of scheduling algorithms can be made available to the ORB. The preferred embodiment introduces an ability to tune transaction processing in an object environment to improve efficiency. Tuning can involve replacement or modification of scheduling algorithms. The algorithms correspond to those used in existing TP monitor products such as:

using a separate process for application servers allowing the underlying hardware to provide isolation of individual applications and to thereby deliver greater systems reliability;

using different processes for each different user allowing the application to be implemented for a single user;

selecting processes from a pre-allocated pool rather than creating them at the time of the client request which improves performance by eliminating process startup overhead.

Figure 9:
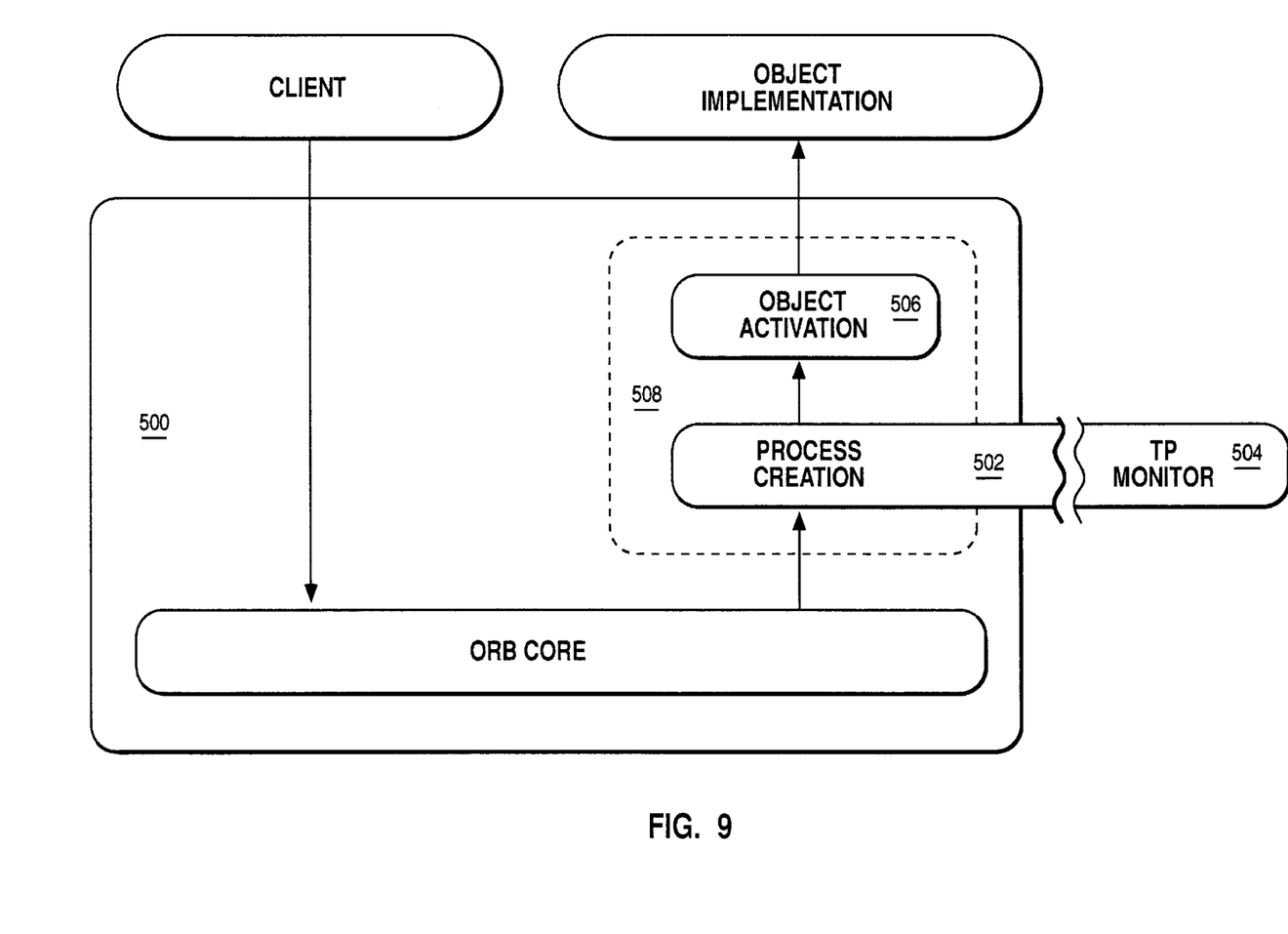
FIG. 9 is a block diagram showing in more detail the components of the preferred embodiment of the present invention.

The preferred embodiment of the present invention is a TP Monitor framework as shown in FIG. 9. The framework is created by modifying an ORB implementation 500 to include low level classes 502 to map the object functions to the equivalent procedural function of a TP monitor 504. The combination of the low level TP monitor classes and the object activation classes comprise the object adapter 508. Decomposition of function to a low level allows easy replacement of the low level classes to support different TP monitors. The TP Monitor Framework allows different TP Monitors to be used with an ORB to satisfy different processing requirements. This generality is in contrast to existing systems in which the TP Monitor is tightly bound to a single transaction processing system. The preferred embodiment of the present invention allows use of a CICS TP Monitor component in the ORB or the use of a Transaction Management Facility (TMF) TP Monitor with the same ORB. The defined low level classes are termed implementation classes and can be adapted to a variety of procedural or object based TP Monitors.

The framework of the preferred embodiment encapsulates selected transaction functions, in particular, transaction scheduling. This encapsulation provides the ability to change the contained function without impacting the application. The encapsulated function is transparent to the application.

In the preferred embodiment, object classes are provided that support the scheduling function. Object methods are defined for the essential scheduling activities. A particular TP Monitor is implemented by subclassing the scheduling classes and overriding selected methods to create a CICS scheduler, an IMS scheduler, etc.

The generalized framework offers the following advantages:

efficient scheduling of the environment in which objects are to be activated;

the ability to define and use objects independent of the TP Monitor selected;

the ability to enhance the basic object environment or the TP monitor without impacting the functions of the other;

the ability to integrate two compatible technologies in a way that best addresses the needs of the commercial transaction processing environment.

The preferred embodiment is implemented by modifying the IBM Distributed SOM product to incorporate a transaction processing monitor framework. The framework contains the necessary low level classes to removeably connect to a procedural TP monitor such as CICS. Removable connections allow the TP monitor to be changed without impacting the application or object activation functions.

In operation, processing of a transaction request will include the following steps: Receiving a transaction request in the ORB. Routing the request to the appropriate object adapter. Testing the process creation classes to determine whether a TP Monitor has been activated. If a TP Monitor is activated, using the TP Monitor to schedule activation of the object. Activating the object implementation as scheduled.

If different TP Monitors are provided for different transactions, after the testing step an additional step of selecting the TP monitor corresponding to the transaction request would be added.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A computer implemented object oriented transaction processing system comprising:

object means for receiving transaction service requests, said transaction requests being generated by an object oriented client, said transaction requests having a first interface;

means for communicating said transaction service requests to an object service responsible for such requests; and object adapter means for processing transaction requests having said first interface, the object adapter means including a scheduler means and an activator means, said scheduler means being separate from said activator means:

said scheduler means for scheduling an object resource to respond to said request, said scheduler means being removably connected to said means for communicating and responsive to said means for communicating, said scheduler means encapsulating a plurality of transaction functions independent of said object oriented client wherein said plurality of transaction functions are encapsulated and operate without any direct interaction with said object oriented client, said scheduler means serving to schedule a limited number of object resources to satisfy a greater number of client transaction service requests; and said activator means for activating said object resource in response to said scheduler means.

2. The system of claim 1, wherein said scheduler means is one of a plurality of different transaction processing monitors.

3. The system of claim 1, wherein said scheduler means is a procedural transaction monitor.

4. The system of claim 3, wherein said scheduler means is selected from IBM CICS, IBM IMS, or Tandem Transaction Management Facility (TMF).

* * * * *